(12) United States Patent
Jung et al.

(10) Patent No.: US 7,710,508 B2
(45) Date of Patent: May 4, 2010

(54) LIQUID CRYSTAL DISPLAY INCLUDING A BEZEL HAVING SIDEWALLS AND SUB-SIDEWALLS

(75) Inventors: Youn-hwan Jung, Suwon-si (KR); Joong-chul Park, Suwon-si (KR)

(73) Assignee: Samsung Mobile Display Co., Ltd., Suwon-si, Gyeonggi-do (KR)

( * ) Notice: Subject to any disclaimer, the term of this patent is extended or adjusted under 35 U.S.C. 154(b) by 211 days.

(21) Appl. No.: 11/907,782

(22) Filed: Oct. 17, 2007

(65) Prior Publication Data
US 2008/0165303 A1 Jul. 10, 2008

(30) Foreign Application Priority Data
Jan. 9, 2007 (KR) .................. 10-2007-0002533

(51) Int. Cl.
*G02F 1/1333* (2006.01)
*H02B 1/26* (2006.01)
(52) U.S. Cl. .................. 349/58; 361/645; 361/651
(58) Field of Classification Search .......... 349/58; 361/645, 651, 681
See application file for complete search history.

(56) References Cited

U.S. PATENT DOCUMENTS

2005/0280750 A1* 12/2005 Cho et al. ............ 349/58
2007/0268425 A1* 11/2007 Jung ..................... 349/58
2008/0074036 A1* 3/2008 Wang et al. ........ 313/504

FOREIGN PATENT DOCUMENTS

| KR | 10-2005-0121006 A | 12/2005 |
| KR | 10-2006-0026605 | 3/2006 |
| WO | WO 90/15359 | 12/1990 |

* cited by examiner

*Primary Examiner*—Mike Qi
(74) *Attorney, Agent, or Firm*—Lee & Morse, P.C.

(57) ABSTRACT

Exemplary embodiments relate to a liquid crystal display and a method thereof. The liquid crystal display may include a display panel having a liquid crystal layer interposed between a first substrate and a second substrate, and a bezel having a lower surface, sidewalls formed perpendicularly to the lower surface, and sub-sidewalls adjacent to the sidewalls. The display panel may be received in the bezel so that the first substrate may correspond to the lower surface, and side surfaces of the first substrate may correspond to the sidewalls.

20 Claims, 5 Drawing Sheets

LIQUID CRYSTAL DISPLAY INCLUDING A BEZEL HAVING SIDEWALLS AND SUB-SIDEWALLS

CROSS-REFERENCE TO RELATED APPLICATION

This application is related to co-pending U.S. patent application Ser. No. 11/907,783, entitled "LIQUID CRYSTAL DISPLAY," which was filed on Oct. 17, 2007.

BACKGROUND OF THE INVENTION

1. Field of the Invention

Exemplary embodiments relate to a liquid crystal display and a manufacturing method thereof, and more particularly, to a liquid crystal display including a display panel received in a bezel and a manufacturing method thereof.

2. Description of the Related Art

Generally, a liquid crystal display (LCD) may include a display panel in which a liquid crystal may be injected between two substrates disposed opposite to each other, a back light unit positioned in a lower portion of the display panel and used as a light source, and a LCD drive integrated circuit (IC) for driving the liquid crystal of the display panel.

Further, a pixel region may be defined by a plurality of gate lines and data lines arranged on the substrates in a matrix type. A thin film transistor controlling signals supplied to each pixel and a pixel electrode connected to the thin film transistor may be formed on one substrate with a portion intersecting the gate lines with the data lines, and a color filter and a common electrode may be formed on the other substrate. Further, each polarizing plate may be formed on a rear surface of the substrates and the back light unit may be disposed on a lower portion of the polarizing plates as a light source.

The LCD drive IC for driving the liquid crystal may be mounted around the pixel region of the display panel. The LCD drive IC may include a printed circuit board (PCB) mounted with components for generating scan signals and data signals, for example, and a driving circuit for providing signals to a display panel. Further, the LCD drive IC may convert external electrical signals into scan signals and data signals, which may then be output to the gate lines and data lines.

However, display panels formed with the substrates may typically be made of glass, which may cause problems, e.g., breakage against impact from external forces. In other words, as portable devices, e.g., a cellular phone, become smaller, a thickness of the display panel may be thinner, which may cause the display panel to be susceptible to impact (even to a small impact). Thus, there has been a demand for the development of a bezel capable of protecting the display panel.

SUMMARY OF THE INVENTION

Example embodiments are therefore directed to a liquid crystal display, and a manufacturing method thereof, which substantially overcome one or more of the problems due to the limitations and disadvantages of the related art.

It is therefore a feature of the exemplary embodiments to provide a liquid crystal display with a bezel capable of safely protecting a display panel from impact.

It is therefore another feature of the exemplary embodiments to provide a liquid crystal display with a bezel having sidewalls to improve strength and rigidity of the liquid crystal display.

At least one of the above and other features of example embodiments may provide a liquid crystal display including a display panel having a liquid crystal layer interposed between a first substrate and a second substrate, and a bezel having a lower surface, sidewalls formed perpendicularly to the lower surface and sub-sidewalls adjacent to the sidewalls. The display panel may be received in the bezel so that the first substrate may correspond to the lower surface, and side surfaces of the first substrate may correspond to the sidewalls.

At least one of the above and other features of example embodiments may provide a method of manufacturing a liquid crystal display. The method may include providing a display panel having a liquid crystal layer interposed between a first substrate and a second substrate, providing a bezel having a lower surface, forming sidewalls perpendicular to the lower surface of the bezel, forming sub-sidewalls adjacent to the sidewalls, and placing the display panel into the bezel so that the first substrate may correspond to the lower surface, and side surfaces of the first substrate may correspond to the sidewalls.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF THE INVENTION

Korean Patent Application No. 10-2007-0002533, filed on Jan. 9, 2007, in the Korean Intellectual Property Office, and entitled: "Liquid Crystal Display," is incorporated by reference herein in its entirety.

Example embodiments will now be described more fully hereinafter with reference to the accompanying drawings. Exemplary embodiments may, however, be embodied in different forms and should not be construed as limited to the embodiments set forth herein. Rather, these example embodiments are provided so that this disclosure will be thorough and complete, and will fully convey the scope of the invention to those skilled in the art.

Figure 1:
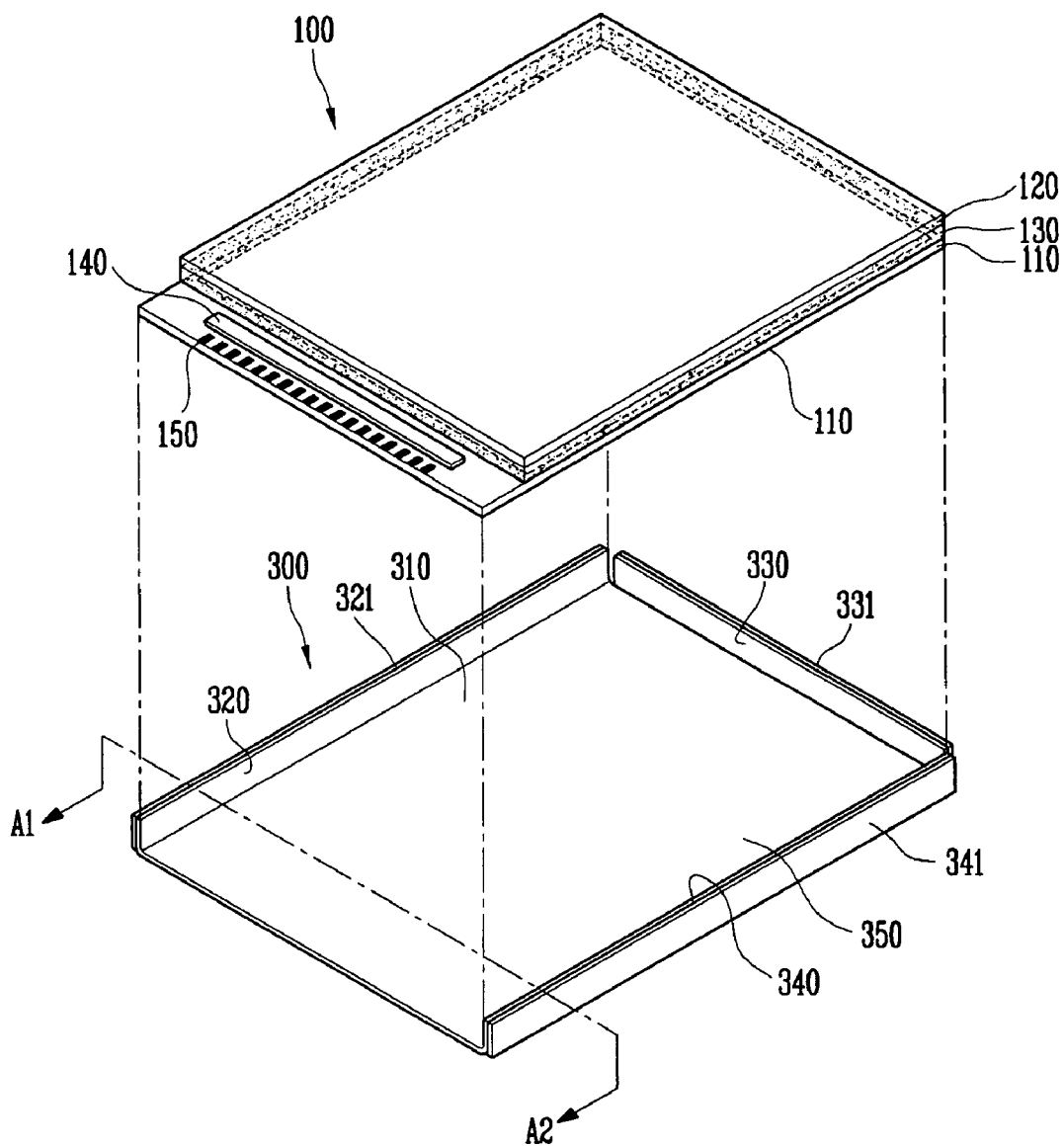
FIG. 1 illustrates an exploded perspective view of a liquid crystal display according to an exemplary embodiment.

FIG. 1 illustrates an exploded perspective view of a liquid crystal display (LCD) according to an exemplary embodiment. The liquid crystal display LCD may include a display panel 100 and a bezel 300 for receiving the display panel 100.

Figure 2:
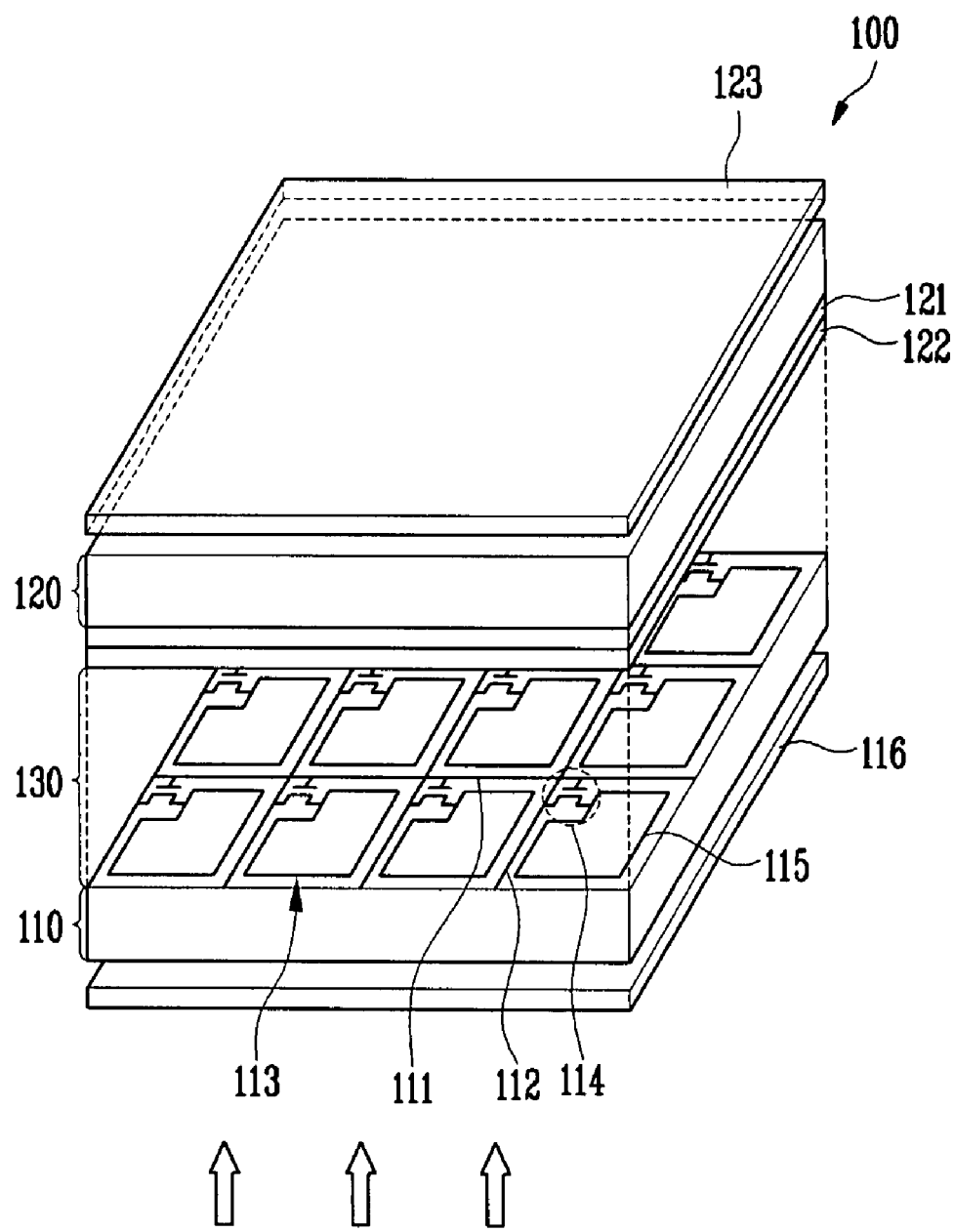
FIG. 2 illustrates an exploded perspective view of the display panel as shown in FIG. 1.

FIG. 2 illustrates an exploded perspective view of the display panel 100 as shown in FIG. 1.

Referring to FIGS. 1 and 2, the display panel 100 may include a lower substrate 110 and an upper substrate 120 disposed opposite to each other, and a liquid crystal layer 130 interposed between the lower substrate 110 and the upper substrate 120. It should be appreciated that other layers and/or elements may be disposed between the lower substrate 110 and the upper substrate 120.

A plurality of gate lines 111 and data lines 112 may be arranged on the lower substrate 110 in a matrix. One skilled in the art should appreciate that the gate lines 111 and the data lines 112 may be arranged in other arrangements. Pixel electrodes 115 may be formed on pixel regions 113 defined by the gate lines 111 and the data lines 112 intersecting each other. A thin film transistor 114 may supply signals to the pixel electrodes 115. The thin film transistor 114 may be formed on the lower substrate 110 with portions intersecting the gate lines 111 with the data lines 112.

A color filter 121 and a common electrode 122 may be formed on the upper substrate 120. Further, polarizing plates 116 and 123 may be installed on rear sides of the lower substrate 110 and the upper substrate 120, respectively, and a back light unit (not shown) may be disposed on a lower portion of the polarizing plate 116 as a light source.

A LCD drive integrated circuit (IC) 140 for driving liquid crystal of the display panel 100 may be mounted on surroundings of the pixel region 113 on the lower substrate. The LCD drive IC 140 may include a printed circuit board (PCB) mounted with components that may generate scan signals, data signals and other signals, and a driving circuit for supplying signals to the display panel 100. The LCD drive IC 140 may also convert the external electrical signals (via a pad part 150) into scan signals and data signals, and may supply the signals to the gate lines 111 and data lines 112. It should be appreciated that the LCD drive IC 140 may include other components besides the ones mentioned above.

The pad part 150 may be connected to a flexible printed circuit (FPC) (not shown) in a film form, and the external signals may input through the FPC.

The bezel 300 may be configured to receive the lower substrate 110 of the display panel 100. The bezel 300 may include sidewalls 320, 330 and 340 extending from an edge of a lower surface 310 and perpendicular to the lower surface 310. Moreover, the bezel 300 may further include sub-sidewalls 321, 331 and 341, which may be bonded to the sidewalls 320, 330 and 340.

A receiving space 350 for receiving the display panel 100 may be formed by the lower surface 310 and the side walls 320, 330 and 340. The display panel 100 may be received so that the lower surface 310 may correspond to the lower substrate 110, and a side surface of the lower substrate 110 may correspond to the sidewalls 320, 330 and 340. One skilled in the art should appreciate that the lower substrate 110 may be attached to the lower surface 310 by an adhesive tape and/or an adhesion. It should further be appreciated that other attachment mechanisms may be employed to attach the lower substrate 110 to the lower surface 310.

Figure 3:
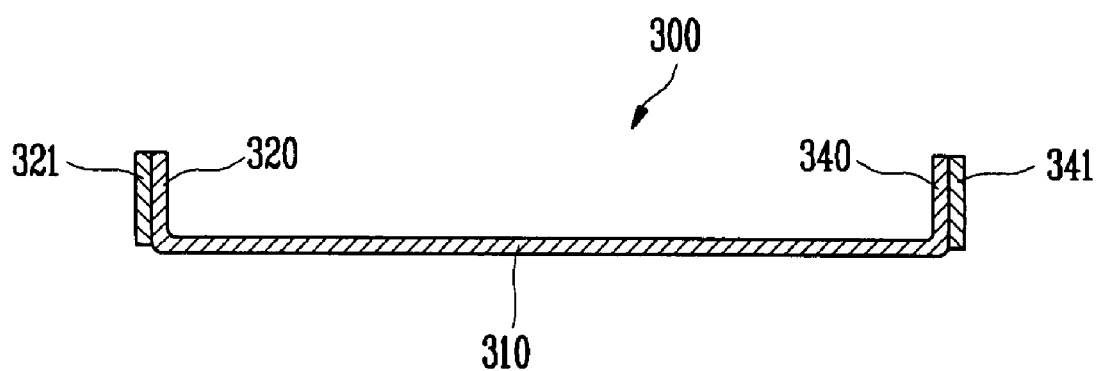
FIG. 3 illustrates a cross-sectional view taken along line A1-A2 in FIG. 1.

FIG. 3 illustrates a cross-sectional view of a bezel 300 according to an exemplary embodiment (taken along line A1-A2 in FIG. 1).

The bezel 300 may be manufactured by bending metal, for example, which may be formed by using a plate shape or a mold. It should be appreciated that other techniques may be employed to form the bezel 300. The side walls 320, 330 and 340 may be integrally formed with the lower surface 310, or the side walls 320, 330 and 340 may be separately assembled after being manufactured in a separate structure.

Figure 4:
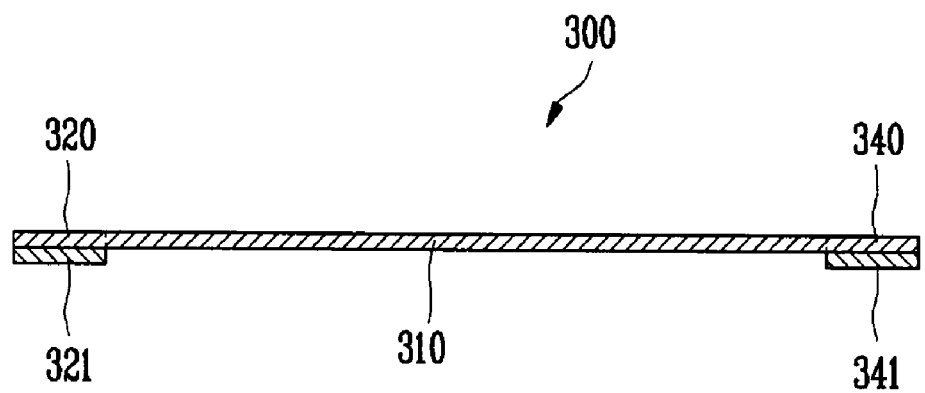
FIG. 4 illustrates a cross-sectional view for a stage of manufacturing method of a bezel as shown in FIG. 1.

The sub-sidewalls 321, 331 and 341 may be bonded to outer side surfaces and/or inner side surfaces of the side walls 320, 330 and 340 by welding. For example, after the formation of the sidewalls 320, 330 and 340 (via bending the bezel 300), the sub-sidewalls 321, 331 and 341 may be bonded to the sidewalls 320, 330 and 340 by welding (as shown in FIG. 3); or the sidewalls 320, 330 and 340 and the sub-sidewalls 321, 331 and 341 may be bonded together by welding and then bent to form the lower surface 310 (as shown in FIG. 4).

Although the above exemplary embodiments describe joining the sidewalls 320, 330 and 340 and sub-sidewalls 321, 331 and 341 by a welding technique, it should be appreciated that other techniques, such as, soldering, brazing, adhering and/or riveting may be employed to secure the walls together.

When the sub-sidewalls 321, 331 and 341 are bonded to the sidewalls 320, 330 and 340, the bezel 300 may produce a sturdy (or high strength) structure. Further, when the sidewalls 320, 330 and 340 and the sub-sidewalls 321, 331 and 341 are bonded (e.g., welded) and then bent to the lower surface 310, manufacturing may be simplified, e.g., reduce time and expenses, while maintaining relatively high strength.

Although the above exemplary embodiments may describe the sidewalls 320, 330 and 340 being formed on three surfaces so that the FPC may be easily provided to the pad part 150, it should be appreciated that the sidewalls may also be configured on four surfaces.

Figure 5:
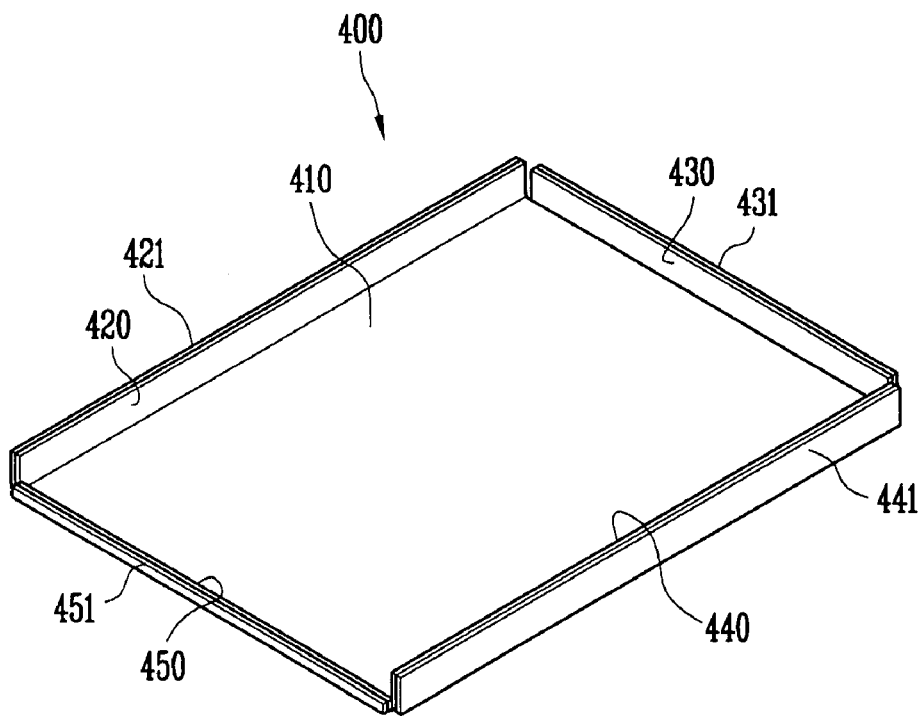
FIG. 5 illustrates a perspective view of a bezel according to another exemplary embodiment.

FIG. 5 illustrates a perspective view of another exemplary embodiment of a bezel.

A bezel 400 may include a lower surface 410, four sidewalls 420, 430, 440 and 450 extending from an edge of the lower surface 410 and perpendicular to the lower surface 410, and sub-sidewalls 421, 431, 441 and 451 bonded to each of the four sidewalls 420, 430, 440 and 450.

Referring to FIG. 5, a height of one sidewall 450 and sub-sidewall 451 may be formed to be equal to or lower than that of the lower substrate 110 so that a FPC (not shown) may be easily inserted to a pad part 150, while at the same time, all side surfaces of the display panel 100 may remain protected. However, it should be appreciated that in other exemplary embodiments, the height of each of the sidewalls 420, 430, 440 and 450 may have different heights or that all the sidewalls 420, 430, 440 and 450 may be the same height.

Accordingly, the bezel 300 (of FIGS. 3 and 4) and bezel 400 (of FIG. 5) may have a double structure configuration (e.g., the sidewalls and the sub-sidewalls may be bonded to each other by welding) so that the bezels 300 or 400 may not be easily deformed by stress and may provide a sturdy (high strength) structure.

Figure 6:
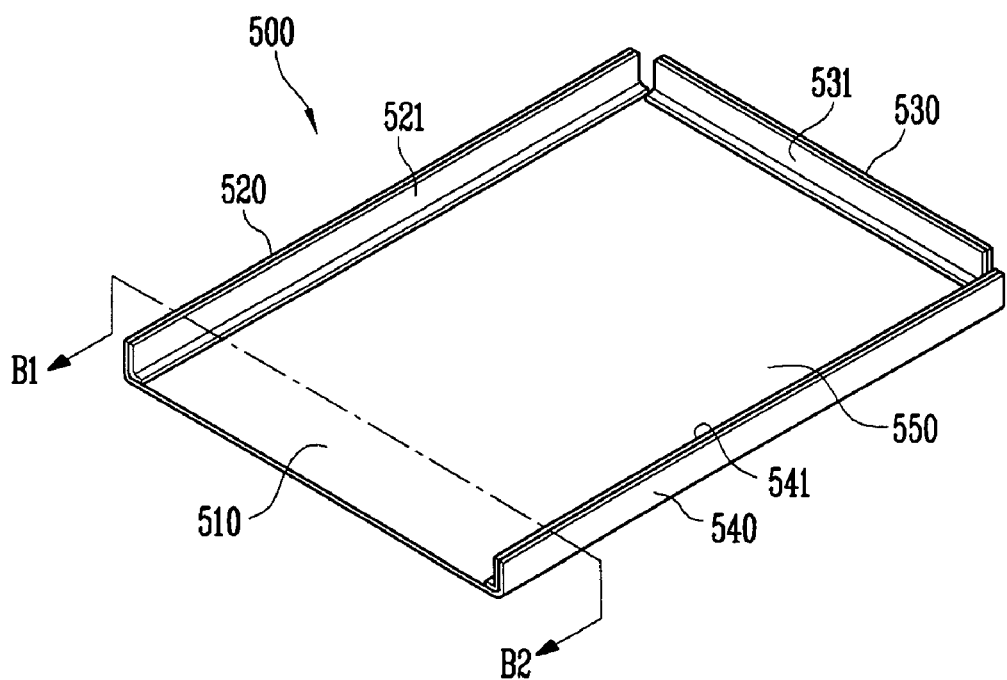
FIG. 6 illustrates a perspective view of a bezel according to another exemplary embodiment.
Figure 7:
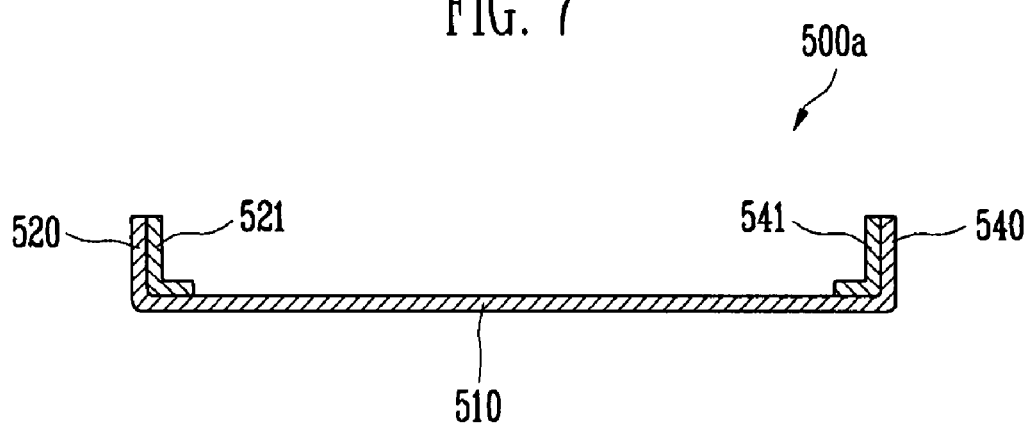
FIGS. 7 and 8 illustrate cross-sectional views taken along line B1-B2 in FIG. 6.
Figure 8:
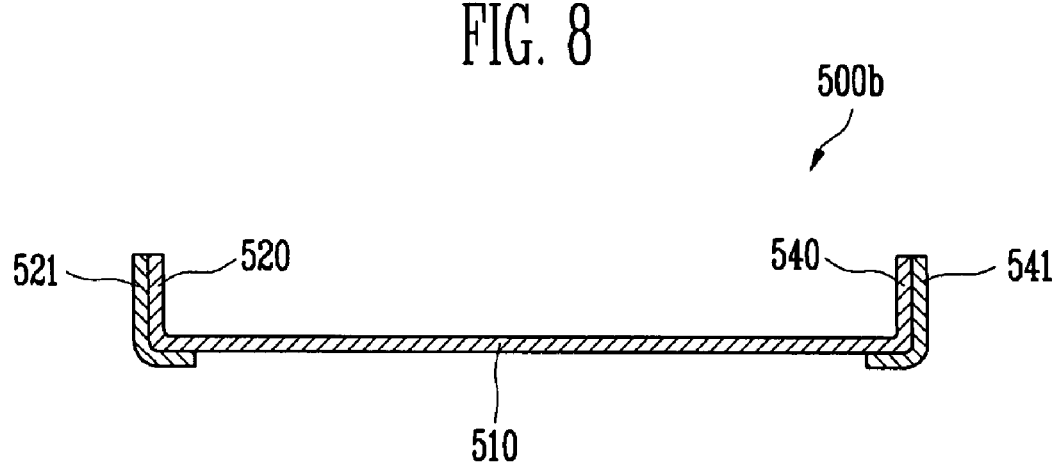

FIG. 6 illustrates a perspective view of another exemplary embodiment of a bezel; and FIGS. 7 and 8 illustrate cross-sectional views taken along line B1-B2 in FIG. 6.

A bezel 500 may include a lower surface 510, sidewalls 520, 530, and 540 extending from an edge of the lower surface 510 and perpendicular to the lower surface 510, and sub-sidewalls 521, 531 and 541 bonded to portions of the sidewalls 520, 530 and 540 and the lower surface 510.

A receiving space 550 for receiving the display panel 100 may be formed by the lower surface 510 and the sidewalls 520, 530 and 540. The display panel 100 may be received so that the lower substrate 110 may correspond to the lower surface 510 and the side surface of the lower substrate 110 may correspond to the sidewalls 520, 530 and 540. One skilled in the art should appreciate that the lower substrate 110 may be attached to the lower surface 510 by an adhesive tape and/or an adhesion. It should further be appreciated that other attachment mechanisms may be employed to attach the lower substrate 110 to the lower surface 510.

The bezel 500 may be manufactured by bending metal, for example, which may be formed by using a plate shape or using a mold. It should be appreciated that other techniques may be employed to form the bezel 500. The side walls 520, 530 and 540 may be integrally formed with the lower surface 510 or the side walls 520, 530 and 540 may be separately assembled after being manufactured in a separate structure.

The sub-sidewalls 521, 531 and 541 may be bonded to outer side surfaces or inner side surfaces of the sidewalls 520, 530 and 540 by welding. For example, after the formation of the sidewalls 520, 530 and 540 by bending the bezel 500, the sub-sidewalls 521, 531 and 541 may be bonded to the outer side surfaces and/or the inner side surfaces of the sidewalls 520, 530 and 540 and the lower surface 510 by welding; or the sidewalls 520, 530 and 540 and the sub-sidewalls 521, 531 and 541 may be bonded together by welding and then bent to form the lower surface 510.

FIG. 7 illustrates an embodiment of the bezel 500, viz., a bezel 500a, in which sub-sidewalls 521, 531 and 541 are secured to the inner side surfaces of the sidewalls 520, 530 and 540 and the lower surface 510. FIG. 8 illustrates another embodiment of the bezel 500, viz., a bezel 500b, in which sub-sidewalls 521, 531 and 541 are secured to the outer side surfaces of the sidewalls 520, 530 and 540 and the lower surface 510.

In accordance with exemplary embodiments, the bezel 500 may include the edge portion of the lower surface 510 and the sidewall being formed of a double-wall structure e.g., the sub-sidewalls 521, 531 and 541 may be bonded to the portions of the sidewalls 520, 530 and 540 and the lower surface 51, e.g., by welding. Therefore, as an entire area of the sidewalls increases, the strength of the sidewalls may be improved by the increase of a value of inertia moment, as illustrated in the Equations 1 and 2.

$$\overline{Ix}[\text{Inertia Moment}] = \frac{bh^3}{12} \quad [\text{Equation 1}]$$

$$\overline{Iy}[\text{Inertia Moment}] = \frac{bh^3}{12} \quad [\text{Equation 2}]$$

Where, b represents width of a sidewall and h represents height of a sidewall.

In particular, because the edge portion may be supported by the sub-sidewalls 521, 531 and 541 in an L-shape, the edge portion may provide a rigid (high strength) structure, and may not be easily deformed by stress. [Reference Document: "Statics and Mechanics of Materials", Chapter 8 Inertia Moment of Area, Written by F. H. Cheng, which is translated by Woo Kim, Seung-Kyu Koo, Doo-Byung Bae, Kwang-Seong Woo and Eui-Seung Hwang].

Exemplary embodiments may provide a bezel having a double-wall structure, e.g., sub-sidewalls bonded to sidewalls or portions of the sidewalls and the lower surface by welding. The sidewalls having the double-wall structure may have a rigid structure (high strength), and may not be easily deformed. Therefore, the impact transferred to the display panel may be reduced, and thus, making it possible to safely protect the display panel and prevent and/or reduce deformation of the sidewalls.

The terminology used herein is for the purpose of describing particular embodiments only and is not intended to be limiting of exemplary embodiments. As used herein, the term "bezel" may mean any structure that may support a display panel and/or may safely protect the display panel from impact.

In the figures, the dimensions of layers and regions may be exaggerated for clarity of illustration. It will also be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Further, it will be understood that when a layer is referred to as being "under" or "above" another layer, it can be directly under or directly above, and one or more intervening layers may also be present. In addition, it will also be understood that when a layer is referred to as being "between" two layers, it can be the only layer between the two layers, or one or more intervening layers may also be present. Like numbers refer to like elements throughout. As used herein, the term "and/or" includes any and all combinations of one or more of the associated listed items.

Unless otherwise defined, all terms (including technical and scientific terms) used herein have the same meaning as commonly understood by one of ordinary skill in the art to which exemplary embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A liquid crystal display, comprising:
   a display panel having a liquid crystal layer interposed between a first substrate and a second substrate; and
   a bezel having a metallic lower surface, metallic sidewalls formed perpendicularly to the lower surface, and metallic sub-sidewalls, each sub-sidewall being adjacent to a corresponding sidewall and each sub-sidewall being welded to the corresponding sidewall,
   wherein the display panel is received in the bezel so that the first substrate corresponds to the lower surface, and side surfaces of the first substrate correspond to the sidewalls.

2. The liquid crystal display as claimed in claim 1, wherein the bezel is a metal plate that is bent to form the sidewalls.

3. The liquid crystal display as claimed in claim 1, wherein the sidewalls are integrally formed on the lower surface of the bezel.

4. The liquid crystal display as claimed in claim 1, wherein the sidewalls are separately formed on the lower surface of the bezel.

5. The liquid crystal display as claimed in claim 1, wherein the sidewalls correspond to only three side surfaces of the display panel.

6. The liquid crystal display as claimed in claim 5, wherein the sub-sidewalls are secured to each of the three corresponding sidewalls.

7. The liquid crystal display as claimed in claim 1, wherein the sidewalls correspond to four side surfaces of the display panel.

8. The liquid crystal display as claimed in claim 7, wherein the sub-sidewalls are secured to each of the four corresponding sidewalls.

9. The liquid crystal display as claimed in claim 7, wherein a height of one sidewall of the sidewalls is equal to or lower than a height of the first substrate.

10. The liquid crystal display as claimed in claim 9, wherein the height of all of the sidewalls is equal to or lower than the height of the first substrate.

11. The liquid crystal display as claimed in claim 1, wherein the sub-sidewalls are welded to outer side surfaces of the sidewalls.

12. The liquid crystal display as claimed in claim 1, wherein the sub-sidewalls are welded to inner side surfaces of the sidewalls.

13. The liquid crystal display as claimed in claim 1, wherein the sub-sidewalls are welded to the lower surface of the bezel.

14. The liquid crystal display as claimed in claim 1, wherein the first substrate is adhered to the lower surface of the bezel.

15. The liquid crystal display as claimed in claim 1, wherein the sub-sidewalls are secured to portions of the sidewall and the lower surface of the bezel.

16. The liquid crystal display as claimed in claim 15, wherein the sub-sidewalls are secured to outer side surfaces of the sidewalls.

17. The liquid crystal display as claimed in claim 15, wherein the sub-sidewalls are secured to inner side surfaces of the sidewalls.

18. The liquid crystal display as claimed in claim 1, wherein the sub-sidewalls are welded to portions of the sidewalls and the lower surface.

19. The liquid crystal display as claimed in claim 1, wherein the lower surface of the bezel extends below the first substrate across substantially an entire area of the first substrate.

20. A liquid crystal display, comprising:
   a display panel having a liquid crystal layer interposed between a first substrate and a second substrate; and
   a bezel having a lower surface, sidewalls formed perpendicularly to the lower surface, and sub-sidewalls adjacent to the sidewalls,
   wherein the display panel is received in the bezel so that the first substrate corresponds to the lower surface, side surfaces of the first substrate correspond to the sidewalls, the sidewalls correspond to four side surfaces of the display panel, and the height of all of the sidewalls is equal to or lower than the height of the first substrate.

* * * * *